(12) United States Patent
Rendall

(10) Patent No.: US 11,990,587 B2
(45) Date of Patent: May 21, 2024

(54) STACK FOR AN ENERGY STORAGE DEVICE

(71) Applicant: Dyson Technology Limited, Wiltshire (GB)

(72) Inventor: Michael Edward Rendall, Newbury (GB)

(73) Assignee: Dyson Technology Limited, Wiltshire (GB)

( * ) Notice: Subject to any disclaimer, the term of this patent is extended or adjusted under 35 U.S.C. 154(b) by 637 days.

(21) Appl. No.: 17/261,514

(22) PCT Filed: Jul. 19, 2019

(86) PCT No.: PCT/GB2019/052039
§ 371 (c)(1),
(2) Date: Jan. 19, 2021

(87) PCT Pub. No.: WO2020/016608
PCT Pub. Date: Jan. 23, 2020

(65) Prior Publication Data
US 2021/0328269 A1   Oct. 21, 2021

(30) Foreign Application Priority Data
Jul. 20, 2018   (GB) .................... 1811878

(51) Int. Cl.
*H01M 10/0585* (2010.01)
*H01M 10/04* (2006.01)
*H01M 10/0525* (2010.01)

(52) U.S. Cl.
CPC ..... *H01M 10/0585* (2013.01); *H01M 10/045* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2008/0032236 A1 | 2/2008 | Wallace et al. | |
| 2009/0148764 A1* | 6/2009 | Kwak | H01M 6/40 429/162 |

(Continued)

FOREIGN PATENT DOCUMENTS

| | | |
|---|---|---|
| CN | 101855770 A | 10/2010 |
| DE | 102015116095 A1 | 3/2017 |

(Continued)

OTHER PUBLICATIONS

International Search Report and Written Opinion dated Oct. 10, 2019, directed to International Application No. PCT/GB2019/052039; 12 pages.

(Continued)

*Primary Examiner* — Wyatt P McConnell
(74) *Attorney, Agent, or Firm* — Tucker Ellis LLP; Michael G. Craig; Heather M. Barnes

(57) ABSTRACT

A method comprises obtaining a stack for an energy storage device, the stack comprising a substrate, a first electrode layer, a second electrode layer, and an electrolyte layer between the first electrode layer and the second electrode layer. The method comprises laser ablating the stack to form a plurality of first grooves in the stack, each of the plurality of first grooves being through the first electrode layer and the electrolyte layer. The method comprises forming, in or on the stack, at least one registration feature, different from each of the plurality of first grooves. An apparatus and a stack for an energy storage device is also disclosed.

20 Claims, 8 Drawing Sheets

(56) References Cited

U.S. PATENT DOCUMENTS

| | | |
|---|---|---|
| 2012/0214047 A1 | 8/2012 | Kwak et al. |
| 2017/0040645 A1 | 2/2017 | Berland et al. |
| 2018/0155578 A1 | 6/2018 | Wolk et al. |

FOREIGN PATENT DOCUMENTS

| | | |
|---|---|---|
| EP | 2833442 A1 | 2/2015 |
| GB | 2548361 A | 9/2017 |
| JP | 2009-266739 A | 11/2009 |
| JP | 2009-544141 A | 12/2009 |
| JP | 2011-501388 A | 1/2011 |
| JP | 2012-119343 A | 6/2012 |
| JP | 2018-517944 A | 7/2018 |
| KR | 10-2006-0034126 A | 4/2006 |
| KR | 10-2016-0003451 A | 1/2016 |
| WO | 2008/011061 A1 | 1/2008 |
| WO | 2009/055529 A1 | 4/2009 |
| WO | 2010/113880 A1 | 10/2010 |
| WO | 2013/145876 A1 | 10/2013 |
| WO | 2018/059971 A1 | 4/2018 |
| WO | 2018/124039 A1 | 7/2018 |

OTHER PUBLICATIONS

Search Report dated Oct. 16, 2018, directed to GB Application No. 1811878.6; 1 pages.
Office Action received for Japanese Patent Application No. 2021-503041, dated Mar. 8, 2022, 4 pages (2 pages of English Translation and 2 pages of Original Document).
Examination Report under Section 18(3) received for GB Application No. 1811878.6, dated Aug. 12, 2021, 3 pages.

\* cited by examiner

STACK FOR AN ENERGY STORAGE DEVICE

REFERENCE TO RELATED APPLICATIONS

This application is a national stage application under 35 U.S.C. 371 of International Application No. PCT/GB2019/052039, filed Jul. 19, 2019, which claims the priority of United Kingdom Application No. 1811878.6, filed Jul. 20, 2018, the entire contents of each of which are incorporated herein by reference.

FIELD OF THE DISCLOSURE

The present disclosure relates to a stack for an energy storage device, and, more specifically, although not exclusively, to methods and apparatus for processing a stack for an energy storage device.

BACKGROUND OF THE DISCLOSURE

A known method of producing energy storage devices such as solid-state thin film cells comprising layers of electrodes, electrolyte and current collectors is to first form a stack comprising a first current collecting layer formed on a substrate, an electrode layer, an electrolyte layer, a second electrode layer and a second current collecting layer. The stack is then cut into separate sections to form individual cells. Each cell can then be coated with a protective layer, for example, in order to prevent passivation of the layers and possible shorts.

In order to form an electrical connection with the cell, for example in order to electrically connect current collectors of multiple cells stacked one on top of another, part of the protective layer may be removed, for example by etching. Alternatively, a mask can be applied prior to the coating process to ensure that a portion of each current collector is left exposed.

However, known formation and processing of stacks for energy storage devices such as solid-state thin film cells can be inefficient, making effective commercialisation difficult. It is therefore desirable to provide efficient methods for forming and processing of a stack for an energy storage device.

SUMMARY OF THE DISCLOSURE

According to some embodiments of the present disclosure, there is provided a method comprising: obtaining a stack for an energy storage device, the stack comprising a substrate, a first electrode layer, a second electrode layer, and an electrolyte layer between the first electrode layer and the second electrode layer; laser ablating the stack to form a plurality of first grooves in the stack, each of the plurality of first grooves being through the first electrode layer and the electrolyte layer; and forming, in or on the stack, at least one registration feature, different from each of the plurality of first grooves. In some embodiments, the registration feature may be for indicating a fold point at or towards which the stack is to be folded. Alternatively or additionally, the registration feature may be for indicating quality control information of the stack.

Forming the registration feature that is different to each of the plurality of first grooves may allow for efficient and reliable further processing of the stack, and hence may allow for efficient production of an energy storage device from the stack. For instance, the registration feature being for indicating a fold point at or towards which the stack is to be folded may allow for efficient and reliable folding of the stack and hence for the efficient production of an energy storage device therefrom. For example, the registration feature may be readily identified by a folding machine or other means which may then fold the stack at or towards the identified registration feature, which may obviate the folding machine or other means needing to perform complicated (and hence inefficient and potentially unreliable) analysis in order to determine where to fold the stack. Alternatively or additionally, the registration feature may be for indicating quality control information of the stack. For example, the registration feature may indicate whether or not a given portion of the stack falls below quality control standards, and hence should not be used or should be compensated for when producing an energy storage device therefrom. This may allow for reliable energy storage device production whilst reducing the need for quality control procedures during further processing of the stack, and hence may allow for efficient energy storage device production.

In some embodiments, forming the at least one registration feature comprises laser ablating the stack to form the at least one registration feature. Forming the registration feature and the plurality of first grooves both by laser ablation may allow that separate methods for forming the first grooves and the registration feature need not be provided, which, in turn, may provide for efficient energy storage device production.

In some embodiments, laser ablating to form the plurality of first grooves and laser ablating to form the at least one registration feature use laser light from a common laser source. This may allow efficient and cost-effective formation of the registration mark and the plurality of first grooves, for example, as compared to the case where separate laser sources are used to form the first groves and the registration feature.

In some embodiments, the method comprises modifying a property of the laser ablating to form the plurality of first grooves, to provide the laser ablating to form the at least one registration feature. This may allow for effective and efficient formation of the registration feature that is different to each of the first grooves, for example where the stack is processed in continuous or near continuous reel-to-reel type processing.

In some embodiments, modifying the property of the laser ablating comprises modifying a property of first laser light, used for the laser ablating to form the plurality of first grooves, to provide second laser light used for the laser ablating to form the at least one registration feature. This may provide an efficient way to modify the property of the laser ablating, for example without needing to modify or interrupt movement of the stack in a reel-to-reel type process, which may allow for efficient energy storage device production.

In some embodiments, for at least one of the plurality of first grooves, laser ablating to form the groove exposes a surface of at least the first electrode layer; and wherein the method comprises: providing a monomer suspended in an inert gas in the region of the groove during the laser ablating thereof such that the monomer is polymerised onto the exposed surface of the first electrode layer. The polymerised monomer being formed onto the exposed edges may, for example, protect the exposed edges from degradation, for example during subsequent processing of the stack. In some examples, the polymerised monomer may be an electrically insulating material. This may avoid direct electrical contact and hence shorting of the layers electrode layers of the stack during laser ablation and/or in further processing of the stack. Polymerising the monomer onto the exposed edges using the laser beam that is used for laser ablating to form the plurality of first grooves may, for example, reduce the need to provide for or obviate a separate deposition system to cover (e.g. electrically insulate) the exposed edges. In addition, or alternatively, such an approach may reduce the need to perform the covering of the exposed edges at a different time, and hence may provide for a more efficient processing of the stack. Providing the monomer suspended in an inert gas may provide for the displacement of oxygen and/or moisture in the region of the laser ablation, which may in turn reduce the propensity of reaction of the layers at the exposed surfaces during laser ablation forming the first grooves. This process may preserve the purity of the layers, which may, in turn, provide for more reliable operation of cells produced from the stack.

In some embodiments, the method comprises moving, concurrently with or intermittently of the laser ablating to form the plurality of first grooves or the at least one registration feature, the stack in a first direction, and wherein each of the plurality of first grooves formed in the stack is elongate in a direction substantially parallel to the first direction. This may allow for example that the plurality of first grooves and/or the registration feature may be formed progressively by movement of the stack relative to a laser system performing the laser ablation. This may allow for relatively fast and efficient formation of the first grooves and/or registration feature, for example in a continuous or near continuous reel-to-reel type processing of the stack.

In some embodiments, one said registration feature is formed per a given number of adjacent ones of the plurality of first grooves. This may allow for efficient segmentation of the stack into cells. For example, in examples where the registration feature indicates a fold point at or towards which the stack is to be folded, having one said registration feature formed per a given number of adjacent ones of the plurality of first grooves may provide that subsequent folding of the stack will result in stack layers of even length, which may allow for effective cell registration and hence cell segmentation.

In some embodiments, the plurality of first grooves are formed sequentially, and a said registration feature is formed after a given number of sequential ones of the plurality of first grooves are formed. Forming the first grooves and registration feature sequentially may allow for efficient and flexible formation of the first grooves and registration feature, for example in a continuous or near continuous reel-to-reel type processing of the stack.

In some embodiments, the registration feature comprises a mark on a surface of the stack, a groove into the stack that is wider and/or deeper and/or has a different shape than each of the plurality of first grooves, or a perforation in the stack. The registration feature comprising a mark on the surface of the stack may allow for efficient cell formation in that it may take less time and resources to form a mark in the surface of the stack as compared to forming a groove or other registration feature through one or more layers of the stack. The registration feature being a groove into the stack that is wider and/or deeper and/or has a different shape than each of the plurality of first grooves, or a perforation in the stack may provide for efficient energy storage device production in that it may facilitate recognition of the registration mark, for example by a folding means, and/or facilitate folding of the stack at the registration feature groove, for example, by promoting a clean fold. The registration feature being a perforation in the stack may alternatively or additionally allow for increased speed and hence efficiency of the laser ablating of the stack, as it may take less laser ablation to form a perforation for example as compared to a continuous groove.

In some embodiments, the method further comprises: identifying the registration feature; and folding the stack at or towards the identified registration feature. Folding the stack at or towards the identified registration feature may allow efficient and reliable folding, for example without, as part of the folding, having to count the number of first grooves between each fold. Folding the stack may allow for efficient segmentation and production of relatively large capacity energy storage devices therefrom.

According to some embodiments of the present disclosure, there is provided apparatus for processing a stack for an energy storage device, the stack comprising a substrate, a first electrode layer, a second electrode layer, and an electrolyte layer between the first electrode layer and the second electrode layer, the apparatus comprising: a laser system arranged to, in use: laser ablate the stack to form a plurality of first grooves in the stack, each of the plurality of first grooves being through the first electrode layer and the electrolyte layer; and wherein the apparatus is arranged to: form, in or on the stack, at least one registration feature, different from each of the plurality of first grooves. The registration feature may be for indicating a fold point at or towards which the stack is to be folded. This may allow for efficient and reliable folding of the stack and hence for the efficient production of an energy storage device. For example, the registration feature may be readily identified by a folding machine or other means which may then fold the stack at or towards the identified registration feature accordingly, which may obviate the folding machine or other means needing to perform complicated (and hence inefficient and potentially unreliable) analysis in order to determine where to fold the stack. Alternatively or additionally, the registration feature may be for indicating quality control information of the stack. For example, the registration feature may indicate whether or not a given portion of the stack falls below quality control standards, and hence should not be used or should be compensated for when producing an energy storage device therefrom. This may allow for reliable energy storage device production whilst reducing the need for quality control procedures during further processing of the stack, and hence may allow for efficient energy storage device production.

According to some embodiments of the present disclosure, there is provided a stack for an energy storage device, the stack comprising a substrate, a first electrode layer, a second electrode layer, and an electrolyte layer between the first electrode layer and the second electrode layer; the stack defining a plurality of first grooves, each first groove being through the first electrode layer and the electrolyte layer; the stack further comprising at least one registration feature, different to each of the plurality of first grooves. The registration feature may be for indicating a fold point at or towards which the stack is to be folded. This may allow for efficient and reliable folding of the stack and hence for the efficient production of an energy storage device. Alternatively or additionally, the registration feature may be for indicating quality control information of the stack. This may allow for reliable energy storage device production whilst reducing the need for quality control procedures during further processing of the stack, and hence may allow for efficient energy storage device production.

In some embodiments, each of the plurality of first grooves has an electrically insulating material deposited therein. The electrically insulating material may protect exposed edges within the first grooves from degradation, for example during subsequent processing of the stack. Alternatively or additionally, the electrically insulating material may avoid direct electrical contact and hence shorting of the electrode layers of the stack during laser ablation and/or in further processing of the stack.

Further features and advantages of the disclosure will become apparent from the following description, given by way of example only, which is made with reference to the accompanying drawings.

DETAILED DESCRIPTION OF THE DISCLOSURE

Details of methods, structures and devices according to examples will become apparent from the following description, with reference to the Figures. In this description, for the purpose of explanation, numerous specific details of certain examples are set forth. Reference in the specification to "an example," "an embodiment," or similar language means that a particular feature, structure, or characteristic described in connection with the example is included in at least that one example or embodiments, but not necessarily in other examples or embodiments. It should further be noted that certain examples and embodiments are described schematically with certain features omitted and/or necessarily simplified for ease of explanation and understanding of the concepts underlying the examples and embodiments.

Figure 1:
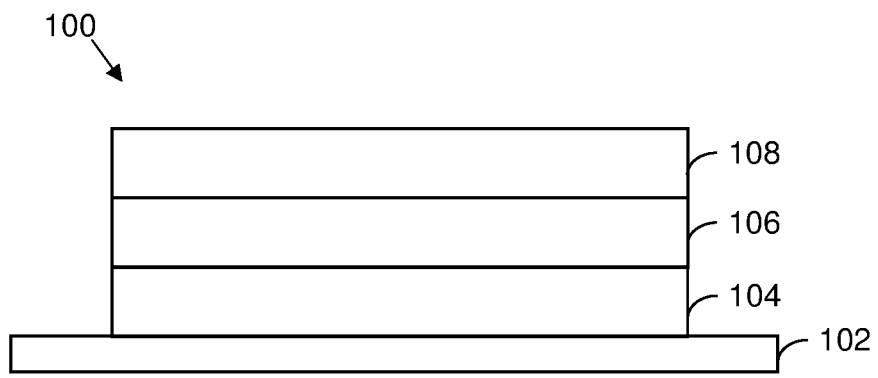
FIG. 1 is a schematic diagram that illustrates a stack for an energy storage device, according to some embodiments.

FIG. 1 shows a stack 100 of layers for an energy storage device. The stack 100 of FIG. 1 may be used as part of a thin film energy storage device having a solid electrolyte, for example.

The stack 100 comprises a substrate 102, a cathode layer 104, an electrolyte layer 106 and an anode layer 108. In the example of FIG. 1, the anode layer 108 is further from the substrate 102 than the cathode layer 104, and the electrolyte layer 106 is between the cathode layer 104 and the anode layer 108. The substrate 102 contacts the cathode layer 104 and supports the stack. While in this example the substrate 102 contacts the cathode layer 104, in other examples there may be additional layers (not shown) in between the substrate 102 and the cathode layer 104.

In some embodiments, the substrate 102 may be or comprise nickel foil; but it will be appreciated that any suitable metal could be used, such as aluminium, copper or steel, or a metallised material including metallised plastics such as aluminium on polyethylene terephthalate (PET).

The cathode layer 104 may act as a positive current collecting layer. The cathode layer 104 may form a positive electrode layer (i.e. that corresponds to a cathode during discharge of a cell of an energy storage device including the stack 100). The cathode layer 104 may comprise a material which is suitable for storing Lithium ions by virtue of stable chemical reactions, such as Lithium Cobalt Oxide, Lithium Iron Phosphate or alkali metal polysulphide salts.

The anode layer 108 may act as a negative current collecting layer. The anode layer 108 may form a negative electrode layer (i.e. that corresponds to an anode during discharge of a cell of the energy storage device including the stack 100). The anode layer 108 may comprise a Lithium metal, Graphite, Silicon or Indium Tin Oxides.

In some embodiments, the anode layer 108 may comprise a negative current collector and a separate negative electrode layer (not shown). In these examples, the negative electrode layer may comprise a Lithium metal, Graphite, Silicon or Indium Tin Oxides, and/or the negative current collector may comprise nickel foil. However, it will be appreciated that any suitable metal could be used, such as aluminium, copper or steel, or a metallised material including metallised plastics such as aluminium on polyethylene terephthalate (PET).

The electrolyte layer 106 may include any suitable material which is ionically conductive, but which is also an electrical insulator such as lithium phosphorous oxynitride (LiPON). The electrolyte layer 106 may be a solid layer, and may be referred to as a fast ion conductor. A solid electrolyte layer may have structure which is intermediate between that of a liquid electrolyte, which for example lacks a regular structure and includes ions which may move freely, and that of a crystalline solid. A crystalline material for example has a regular structure, with an ordered arrangement of atoms, which may be arranged as a two-dimensional or three-dimensional lattice. Ions of a crystalline material are typically immobile and may therefore be unable to move freely throughout the material.

The stack 100 may for example be manufactured by depositing the cathode layer 104 on the substrate 102. The electrolyte layer 106 is subsequently deposited on the cathode layer 104, and the anode layer 108 is then deposited on the electrolyte layer 106. Each layer of the stack 100 may be deposited by flood deposition, which provides a simple and effective way of producing a highly homogenous layer, although other deposition methods are possible.

The stack 100 of FIG. 1 may undergo processing to manufacture an energy storage device.

Figure 2:
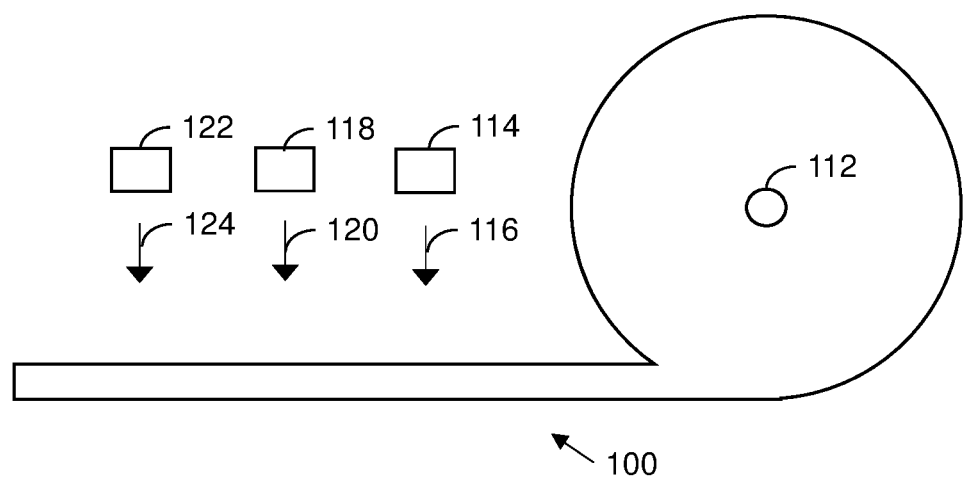
FIG. 2 is a schematic diagram that illustrates one way of processing the stack of FIG. 1 for the manufacture of an energy storage device, according to some embodiments.

A general overview of an example of processing that may be applied to the stack 100 of FIG. 1 is illustrated schematically in FIG. 2.

In FIG. 2, the stack 100 is processed for the manufacture of an energy storage device. The stack 100 in this example is flexible, allowing it to be wound around a roller 112, for example, as part of a roll-to-roll manufacturing process (sometimes referred to as a reel-to-reel manufacturing process). The stack 100 may be gradually unwound from the roller 112 and subjected to processing.

In the example of FIG. 2, grooves may be formed in the stack 100 using a first laser 114. The first laser 114 is arranged to apply laser beams 116 to the stack 100 to remove portions of the stack 100 by laser ablation, thereby forming the grooves.

After formation of the grooves, electrically insulating material may be introduced into at least some of the grooves using an insulating material system 118. An electrically insulating material may be considered to be electrically non-conductive and may therefore conduct a relatively a small amount of electric current when subjected to an electric field. Typically, electrically insulating material (sometimes referred to as an insulator) conducts less electric current than semiconducting materials or electrically conductive materials. However, a small amount of electric current may nevertheless flow through an electrically insulating material under the influence of an electric field, as even an insulator may include a small amount of charge carriers for carrying electric current. In examples herein, a material may be considered to be electrically insulating where it is sufficiently electrically insulating to perform the function of an insulator. This function may be performed for example where the material insulates one element from another sufficiently for short-circuits to be avoided.

Referring to FIG. 2, after introduction of the electrically insulating material, the stack 110 is cut to form separate cells for an energy storage device. In some examples, hundreds and potentially thousands of cells can be cut from a roll of the stack 100, allowing multiple cells to be manufactured in an efficient manner.

In FIG. 2, the cutting operation is performed using a second laser 122, which is arranged to apply laser beams 124 to the stack 100. Each cut may for example be through the centre of an insulating plug such that the plug is split into two pieces, each piece forming a protective covering over exposed surfaces including edges, to which it has attached.

Although not shown in FIG. 2 (which is merely schematic), it is to be appreciated that, after introduction of the insulating material (or otherwise), the stack may be folded back on itself to create a z-fold arrangement having for example tens, possibly hundreds, and potentially thousands, of layers with each of the insulating plugs aligned. The laser cutting process performed by the second laser 122 may then be used to cut through the z-fold arrangement in a single cutting operation for each of the aligned sets of plugs.

After cutting the cells, electrical connectors can be provided along opposite sides of a cell, such that a first electrical connector on one side of the cell contacts the cathode layer(s) 104, but is prevented from contacting the other layers by the electrically insulating material. Similarly, a second electrical connector on an opposite side of the cell can be arranged in contact with the anode layer(s) 108, but is prevented from contacting the other layers by the insulating material. The insulating material may therefore reduce the risk of a short-circuit between the anode and cathode layers 104, 108, and the other layers in each cell. The first and second electrical connectors may, for example, comprise a metallic material that is applied to the edges of the stack (or to the edges of the intermediate structure 110) by sputtering. The cells can therefore be joined in parallel in an efficient manner.

The foregoing description provides a general overview of an example of a stack 100 for an energy storage device, as well as an example of processing that may be applied to the stack 100, for example for the production of an energy storage device. The following description provides example methods and apparatuses for processing a stack 200 (which may be the same as or similar to the stack 100 described with reference to FIG. 1), which may provide for improvements in efficiency in the processing of the stack 200 and, hence, for the efficient production of an energy storage device such as a cell produced therefrom.

Figure 3:
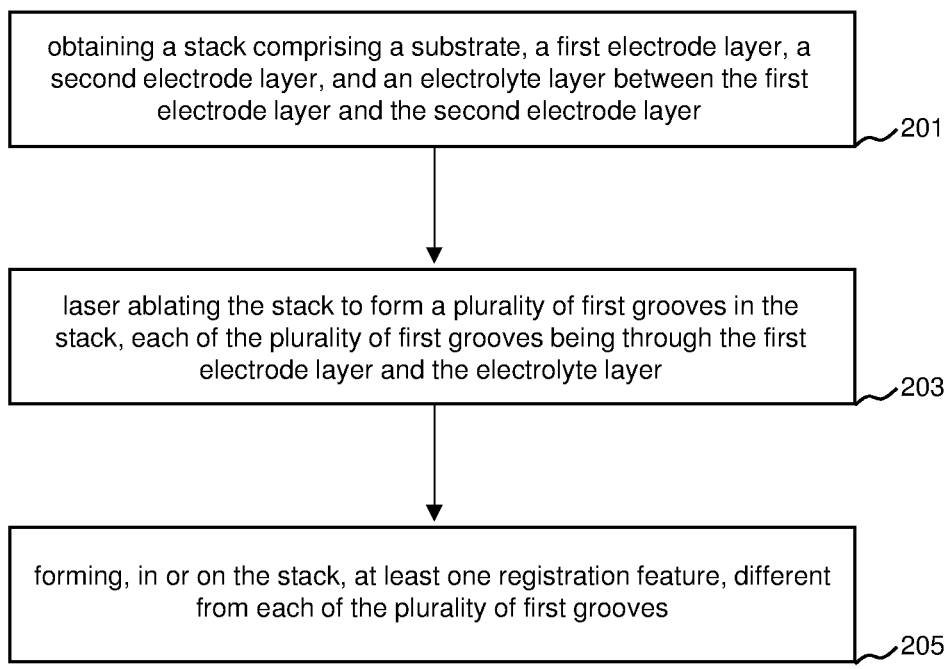
FIG. 3 is a flow diagram that illustrates a method of processing a stack, according to some embodiments.

Referring to FIG. 3, there is illustrated schematically a method of processing an energy storage device stack 200, according to an example.

In broad overview the method comprises, in step 201, obtaining a stack for an energy storage device, the stack comprising a substrate, a first electrode layer, a second electrode layer, and an electrolyte layer between the first electrode layer and the second electrode layer. The method further comprises, in step 203, laser ablating the stack to form a plurality of first grooves in the stack, each of the plurality of first grooves being through the first electrode layer and the electrolyte layer. The method further comprises, in step 205, forming, in or on the stack, at least one registration feature, different from each of the plurality of first grooves. In this example, the registration feature is for indicating a fold point at or towards which the stack is to be folded.

As explained in more detail hereafter, the method may allow for efficient and reliable folding of the stack, and hence, for example, for the efficient production of an energy storage device such as a cell.

In some examples, the registration feature may be formed by methods other than laser ablation, for example by printing or scribing. For example, a registration feature may be formed by depositing a material, e.g. printing a material, on the stack 200. As another example, the registration feature may be formed by scribing or forming some other mark (e.g. not necessarily using laser ablation) in the stack.

However, in examples described hereafter, forming the at least one registration feature comprises laser ablating the stack to form the at least one registration feature. This may be efficient as it may obviate the provision of separate means for forming the first grooves and the registration feature.

Figure 4:
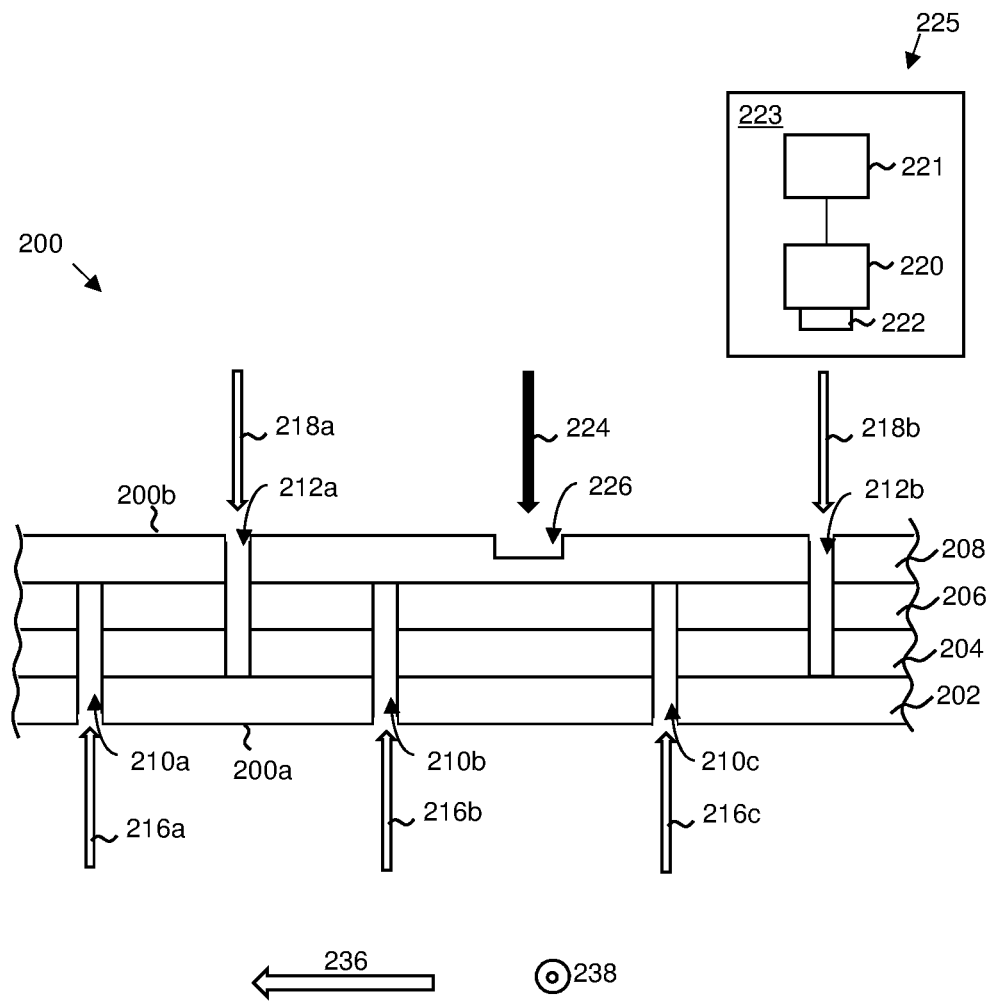
FIG. 4 is a schematic diagram that illustrates one way of processing a stack, according to some embodiments.

Referring now to FIG. 4, there is illustrated schematically an energy storage device stack 200 (i.e. that may be obtained in accordance with examples of step 201 of the method described with reference to FIG. 3) having laser ablations 216a-216c, 218a, 218b applied thereto to form a plurality of first grooves 210a-210c, 212a, 212b (in accordance with examples of step 203 of the method described with reference to FIG. 3), and having laser ablation 224 applied thereto to form a registration feature 226 (in accordance with examples of step 205 of the method described with reference to FIG. 2).

The stack 200 may be the same as or similar to that described with reference to FIG. 1. In the example illustrated in FIG. 4, the energy storage device stack 200 comprises a substrate layer 202, a cathode layer 204, and electrolyte layer 206, and an anode layer 202. These may be the same as or similar to the layers of the stack 100 described with reference to FIG. 1. For example, the cathode layer 204 may comprise a cathode electrode and a cathode current collector (not shown in FIG. 4) and the anode layer 208 may comprise an anode electrode and an anode current collector (not shown in FIG. 3). In the example illustrated in FIG. 4, the electrolyte layer 206 is between the cathode layer 204 and the anode layer 208, the cathode layer 204 is adjacent to the substrate layer 202, the electrolyte layer 206 is adjacent to the cathode layer 204, and the anode layer 208 is adjacent to the electrolyte layer 206.

The cathode layer 204 and the anode layer 202 are examples of the first and second electrode layers described with reference to FIG. 3.

As illustrated in FIG. 4, the energy storage device stack 200 has a plurality of first grooves 210a-210c, 212a, 212b formed therein. The plurality of first grooves 210a-210c, 212a, 212b are formed in the stack 200 by laser ablation (represented in FIG. 4 by arrows 216a-216c, 218a, 218b respectively).

As used herein, the term "groove" may refer to a channel, slot or trench that may be continuous or non-continuous, and may in some examples be elongate, and which may extend only part way through the layers 202-208 of the stack 200.

As used herein, "laser ablation" may refer to the removal of material from the stack 200 using a laser-based process. This removal of material may comprise any one of multiple physical processes. For example the removal of material may comprise (without limitation) any one or combination of melting, melt-expulsion, vaporisation (or sublimation), photonic decomposition (single photon), photonic decomposition (multi-photon), mechanical shock, thermo-mechanical shock, other shock-based processes, surface plasma machining, and removal by evaporation (ablation). As explained in more detail hereafter, the first grooves 210a-210c, 212a, 212b may be formed to partially segment the stack 200 into partial cell structures, but without (at this stage) completely separating those individual cell structures. This may allow for further processing and handling of the stack 200 (for example the folding described in more detail below), which may improve efficiency.

A first set 216a-216c of the first grooves each extend into the stack from an opening on a first side 200a of the stack 200, and a second set 218a, 218b of the first grooves each extend into the stack from an opening on a second side 200b of the stack 200, opposite to the first side 200a.

Each of the first set 216a-216c and the second set 218a, 218b of first grooves are formed through a first electrode layer of the stack and the electrolyte layer 206. Specifically, the first set 216a-216c of first grooves are formed through the cathode layer 204 and the electrolyte layer 206 (i.e. for the first set 216a-216c of first grooves, the "first electrode layer" referenced in FIG. 3 is the cathode layer 204), and the second set 218a, 218b are formed through the anode layer 208 and the electrolyte layer 206 (i.e. for the second set 218a, 218b of first grooves, the "first electrode layer" referenced in FIG. 3 is the anode layer 208).

The first set 216a-216c of first grooves are each formed through the substrate layer 202, the cathode layer 204 and the electrolyte layer 206, but not through the anode layer 208. In other words, each of the first set 216a-216c of first grooves are formed to reveal the anode layer 208. The second set 218a, 218b of first grooves are each formed through the anode layer 208, the electrolyte layer 206, the anode layer 204, but not through the substrate layer 202. In other words, each of the second set 218a, 218b of first grooves are formed to reveal the substrate layer 202.

Each of the first grooves 210a-210c, 212a, 212b has a depth that extends into the stack 200 in a direction substantially perpendicular to the plane of the layers 202-208; a width substantially perpendicular to the depth (the width and depth of each groove are in the plane of the page in the sense of FIG. 4), and a length that extends in a direction substantially parallel to the plane of the layers 202-208 and substantially perpendicular to the width (i.e. into the plane of the page in the sense of FIG. 4). Each of the first grooves 210a-210c, 212a, 212b are substantially parallel to one another in both the depth and length directions.

It should be noted that FIG. 4 (similarly to the other Figures) is a schematic diagram for illustrative purposes only. For example, the dimensions and relative spacings of the features illustrated in FIG. 4 (e.g. the layers 202-208, the first grooves 210a-210c, 212a, 212b, the registration feature 226) are schematic only and merely serve to illustrate example structures and processes described herein.

As illustrated in FIG. 4, the energy storage device stack 200 has a registration feature 226 formed therein. The registration feature 226 is for indicating a fold point at or towards which the stack 200 is to be folded. In this example, the registration feature 226 is formed in the stack 200 by laser ablation (represented in FIG. 4 by arrow 224). The registration feature 226 is different to each of the plurality of first grooves 210a-210c, 212a, 212b. In this example, the registration feature 226 is also a groove, but is different to each of the first grooves in that the registration feature 226 extends only part-way into the anode layer 208 from the second side 200b of the stack (i.e. its depth is less than that of each of the first grooves 210a-210c, 212a, 212b), and also in that it is wider than each of the first grooves 210a-210c, 212a, 212b.

As mentioned above, the registration feature 226 is for indicating a fold point at or towards which the stack 200 is to be folded. As explained in more detail hereafter, folding the stack 200 may allow for efficient segmentation of the stack 200 into battery cells. Forming the registration feature 226 (that is different to the first plurality of grooves) may allow for efficient and reliable identification of a fold point in the stack 200 during further processing of the stack. For example, the stack 200, having the first grooves 210a-210c, 212a, 212b and registration feature 226 formed therein, may be processed by a folding machine (described in more detail hereafter), and the registration feature 226 may provide a means by which the folding machine can efficiently register (i.e. identify and/or align with) a point at which the stack 200 is to be folded, for example, without having to count the first grooves between each fold.

It will be appreciated that the registration feature 226 illustrated in FIG. 4 is an example and that other forms of registration feature 226 for indicating a fold point at or towards which the stack 200 is to be folded may be used.

In some embodiments, the registration feature 226 may have a depth that is less than the depth of each of the first grooves 210a-210c, 212a, 212b. For example, the registration feature may be a shallow cut or a mark 226 that does not penetrate more than one external layer 208, 202 of the stack. For example, the shallow cut or mark 226 in this example penetrates only part-way into an external layer 208, 202 of the stack 200. In some embodiments, the shallow cut or mark 226 may be substantially the same as the plurality of first grooves, except that the mark 226 has a depth that is less than the depth of each of the first grooves. The registration feature 226 having a depth that is less than the depth of each of the first grooves 210a-210c, 212a, 212b may allow for the speed and hence efficiency of the processing of the stack 200 to be improved. For example, it may take less time for the relatively shallow registration feature 226 to be formed by laser ablation, for example, as compared to if another first groove were formed instead. It may not be necessary to form a said first groove at a point at which the stack 200 is to be folded, because, as described in more detail hereafter, the portion of the stack 200 at a fold point may in any case be discarded as waste. Therefore, by forming a shallow registration feature 226, as described, the speed of the laser ablation of the stack 200 may be increased without negatively affecting the cells segmented therefrom.

In some embodiments, the shallow cut or mark 226 may have a specific shape or pattern, for example a predetermined shape or pattern, for example that is different to a shape or pattern of other features of the stack 200. This may allow the registration feature 226 to be efficiently and reliably recognised by a recognition means, such as a camera or the like, for example, of a folding machine (described in more detail hereafter).

It will be appreciated that, in some embodiments, the registration feature 226 may not be precisely at the point at which the stack 200 is to be folded. The registration feature 226 may in some examples be towards such a point and nonetheless effectively indicate a fold point. For example, a folding machine (not shown) may be configured to fold the stack at some predetermined distance from the registration feature 226 or at some predetermined time after recognition of the registration feature 226 (e.g. if the stack 200 is moving relative to the folding machine).

In some embodiments, the registration feature 226 may be a groove into the stack that is wider and/or deeper and/or has a different shape than each of the plurality of first grooves 210a-210c, 212a, 212b. For example, the registration feature groove 226 may have a width and/or depth and/or shape that facilitates folding of the stack 200 at the registration feature groove 226. For example, the registration feature groove 226 may have a shape in cross section in a plane perpendicular to its length and to the layers of the stack 200 that is different to that of each of the first grooves. For example, the registration feature groove 226 may be tapered. For example, the width of the registration feature groove 226 may increase with increasing proximity to an outer surface 200a, 200b of the stack. This may facilitate folding of the stack 200 at the registration feature groove 226, for example, by promoting a clean fold. Alternatively or additionally, the registration feature groove 226 may be deeper and/or wider than the first grooves 210a-210c, 212a, 212b. This may also facilitate folding of the stack 200 at the registration feature groove 226. Having the registration feature groove 226 being wider than the first grooves may also facilitate recognition of the registration feature 226, for example, by a folding machine (described in more detail hereafter).

In some embodiments, the registration feature 226 may comprise a perforation in the stack 200. For example, the registration feature 226 may comprise a series of spaced apart slits (not shown) in the stack 200, which may, for example, extend parallel to the length of the first grooves 210a-210c, 212a, 212b. The perforation may weaken the stack 200, and hence may facilitate folding of the stack, along the perforation. For example, the slits of the perforation may extend through the entire depth of the stack 200, i.e. through each of the substrate layer 202, the cathode layer 204, the electrolyte layer 206, and the anode layer 208, thereby to effectively form apertures through the stack. In this way, the stack 200 may be significantly weakened along the perforation to facilitate folding, while not being entirely segmented, which may allow (continued) processing of the stack 200. Further, forming a series of slits (as per the perforation) may allow for increased speed and hence efficiency of the laser ablating of the stack 200, as it may take less laser ablation to form slits as compared to a corresponding groove (e.g. less material needs to be ablated).

In some embodiments, conveniently, the laser ablating of the stack to form the plurality of first grooves 210a-210c, 212a, 212b, as per step 203 of the method described with reference to FIG. 3, and the laser ablating of the stack 200 to form the registration feature 226, as per step 205 of the method described with reference to FIG. 3, use laser light from a common laser source 220.

For example, in the example illustrated schematically in FIG. 4, the laser ablation 218, 218b forming the second set of first grooves 212a, 212b, and the laser ablation 224 forming the registration feature 226, both use laser light from the common laser source 220.

In some embodiments, the laser source 220 may comprise two or more light sources (not shown), for example, which may each produce light (e.g. laser light) which may be mixed to produce a single laser beam. In these embodiments, it will be appreciated that the system of the two or more light sources and the means for combination thereof may be referred to as a single "laser source 220".

In some embodiments, the method may comprise moving the stack 200 in a first direction of travel 236 (i.e. right to left in the sense of FIG. 4). As illustrated in FIG. 4, each of the plurality of first grooves 216, 218 that are formed in the stack 200 is elongate in a direction substantially perpendicular to the first direction 236 (i.e. the first direction 236 is substantially perpendicular to the length of each of the plurality of first grooves 216, 218). For example, the stack 200 may be moved in a reel-to-reel type process (for example as described with reference to FIG. 2), in which the stack 200 is wound out from a first reel for laser ablation and/or forming the registration feature and wound onto a second reel once the laser ablation and/or forming of the registration feature has been performed. The first direction of travel 236 may be between the two reels (not shown in FIG. 4; see e.g. FIG. 6). The stack 200 may be moved concurrently with or intermittently of the laser ablating to form the first grooves 218, 216 or the at least one registration feature 226.

In some embodiments, the stack 200 may me moved in the first direction 236 such that successive portions of the stack are aligned with an ablation beam of the laser source 220. For example, the stack 200 may first be positioned (not shown) relative to the laser source 200 so that a laser ablation beam 218a forms a first 212a of the first grooves. The stack may then be moved along the travel direction 236 such that the stack is positioned (not shown) relative to the laser source 220 for the laser ablation beam 224 to form the registration feature 226. The stack 200 may then be moved along the travel direction 236 again such that the laser source 220 is positioned (i.e. as shown in FIG. 4) relative to the stack 200 for an ablation beam 218b to form a second 212b of the first grooves.

In some embodiments, the laser source 220 or the ablation beam produced thereby may be moved to be appropriately positioned relative to the stack 200 for the formation of the first grooves 212a, 212b and the registration feature 226.

In some embodiments, the laser source 220 may produce a source beam that is split or otherwise manipulated to provide two or more of the ablation beams 218a, 224, 218b for forming the first grooves 212a, 212b and the registration feature 226.

In alternative embodiments, the stack 200 is moved in a different, second direction of travel 238 (i.e. into or out of the page in the sense of FIG. 4). Each of the plurality of first grooves 216, 218 formed in the stack may be elongate in a direction substantially parallel to the second direction 238 (i.e. the second direction 238 may be substantially parallel to the length of each of the plurality of first grooves 216, 218). For example, the method may comprise moving, concurrently with or intermittently of the laser ablating to form the first grooves 218, 216 or the at least one registration feature 226, the stack 200 in the second direction 238. For example, the stack 200 may be moved in the second direction 238 such that each first groove 212a, 212b etc. (and for example the registration feature 226) may be progressively formed lengthwise by movement of the stack 200 relative to the laser 200. Again, the stack 200 may be moved in a reel-to-reel type process, in which the stack 200 is wound out from a first reel for laser ablation and wound onto a second reel once the laser ablation has been performed. The second direction of travel 236 may be between the two reels (not shown in FIG. 4; but see e.g. FIG. 7). In this example, in order that the first grooves 212a, 212b and the registration feature 226 are formed by laser ablation using a common laser source 220, multiple laser beams may be distributed across the stack 200. For example, the laser source 220 may produce a source beam that is split in order to provide ablation beams 218a, 224, 218 that are distributed across the stack 200. Additionally or alternatively, in some embodiments, multiple laser sources (not shown) may be provided, one for forming each first groove 212a, 212b. The laser system 223 may be provided as a static rig relative to which the stack 200 is moved in order to form each of the first grooves 212a, 212b and the registration feature 226. This may provide for efficient, substantially continuous, and/or reliable laser ablation. In other embodiments, one or more laser sources 220 or beams produced thereby may be arranged for example to move across the stack 200 (i.e. in a direction perpendicular to the second direction of travel 238 of the stack). This may provide for example that less laser beams and or laser sources, or a lower power of laser source 220, may be used, which may provide a cost-effective arrangement.

In any case, in examples where the laser ablation forming the first grooves 212a, 212b and the registration feature 226 use a common laser source 220, efficient and cost-effective ablation may be provided for, for example, as compared to the case where separate laser sources are used to form the first groves 212a, 212b and the registration feature 226.

The laser ablation performed on different sides 200a, 200b of the stack may use laser light from different laser sources (not shown) or the same laser source 220. Laser light from the same laser source 220 may be provided on different sides 200a, 200b of the stack 200 for example by appropriately splitting and guiding a source beam of the laser source 220. Again, laser ablating using a common laser source 220 may allow for efficient and cost-effective ablation.

In some embodiments, one registration feature 226 may be formed per a given number of adjacent ones of the plurality of first grooves 216a-216c, 218a, 218b. For example, there may be a plurality of registration features 226 formed, with there being one registration feature 226 formed after or in between every N first grooves, for example where N is a positive integer in the range 2-1000. It will be appreciated that any predetermined number may be used. Forming one registration feature 226 per given number of adjacent ones of the plurality of first grooves 216a-216c, 218a, 218b may provide that subsequent folding of the stack (as described in more detail hereafter) at or towards the registration feature(s) 226 will result in layers of even length and/or with correct cell registration, which may allow for more efficient cell segmentation (described in more detail hereafter).

In some embodiments, the given number of adjacent ones of the plurality of first grooves 216a-216c, 218a, 218b that are between consecutive registration features 226 may be determined based on quality control information. For example, the location of the formation of the registration feature in or on the stack 200 may be determined based on information relating to whether a portion of the stack 200 falls below quality control standards. Whether or not a portion of the stack falls below quality control standards may be determined using suitable analysis of the stack. For example, the number of grooves between registration features may be determined based on information relating to whether a portion of the stack 200 falls below quality control standards, and hence that more first grooves should be included in between registration features 226. This may allow for consistent cell production whilst reducing the need for quality control procedures in the later processing of the stack 200, and hence may allow for a more efficient process.

In some embodiments, the plurality of first grooves 216a-216c, 218a, 218b may be formed sequentially (i.e. one after another), and a registration feature 226 may be formed after a given number of sequential ones of the plurality of first grooves 216a-216c, 218a, 218b are formed. For example, in the example where the stack 200 is moved in the first direction 236, perpendicular to the length of the first grooves 216a-216c, 218a, 218b, (or otherwise) the laser ablation to form the registration feature 226 may be performed after the laser ablation to form a given number of first grooves (e.g. 30).

In some embodiments, a property of the laser ablating for forming the plurality of first grooves 210a-210c, 212a, 212b may be modified in order to provide the laser ablating for forming the at least one registration feature 226.

For example, a property of the laser ablating that may be modified may be a speed at which the stack 200 is moved relative to the laser source 220 and/or an ablation beam produced thereby. For example, an ablation beam may be moved at first speed relative to the stack 200 to produce each of the plurality of first grooves 210a-210c, 212a, 212b, and may be moved at a second, different, speed relative to the stack 200 to produce the registration feature 226. For example, the first speed may be faster than the second speed, such that the registration feature 226 may be formed as a deeper groove than each of the plurality of first grooves 210a-210c, 212a, 212b. As another example, the first speed may be slower than the second speed, such that the registration feature 226 may take the form of a shallow cut, mark or perforation.

As another example, a property of the laser ablating that is modified may be a property of the laser light that is used in the ablation. For example, the method may comprise modifying a property of first laser light 218a, 218b. that is used for the laser ablating for forming the plurality of first grooves 210a-210c, 212a, 212b, to provide second laser light 224 that is used for the laser ablating for forming the at least one registration feature 226. For example, the ablation light that is used to form the plurality of first grooves 210a-210c, 212a, 212b and the registration feature 226 may be provided from a common laser source 220, and a property of the laser light from the common laser source 220 may be modified to provide for different forms of the first grooves 210a-210c, 212a, 212b and the registration feature 226.

In other embodiments, the property of the laser light that is modified may (without limitation) comprise one or more of a shape of the first laser light, an intensity of the first laser light, a power of the first laser light, a focus position of the first laser light, and a repetition frequency of the laser light.

Modifying the shape of the laser light (e.g. the shape of a cross section of the laser beam in a plane perpendicular to the axis of the beam) may allow, for example, for formation of a registration feature 226 having a predetermined shape or pattern, for example, that may be recognisable by a folding machine.

Modifying an intensity of the first laser light (e.g. power per unit area) may allow, for example, for the formation of a registration feature 226 that has a different depth to that of each first grooves 212a, 212b. For example, using lower intensity laser light to form the registration feature 226 may produce a registration feature 226 that is shallower than each of the first grooves 212a, 212b. Conversely, using higher intensity laser light to form the registration feature 226 may produce a registration feature 226 that is deeper than that of each of the first grooves 212*a*, 212*b*. Changing the intensity may allow for the registration feature 226 that is formed to be different to each of the plurality of first grooves 212*a*, 212*b*, but without having to change a speed of travel of the ablation beam(s) relative to the stack, which may allow for more efficient processing. The intensity of the laser light may be modified by modifying a power of the laser light and/or a beam size or focus of the laser light. Modifying a power of the laser light may allow for the intensity of the laser light to be modified without having to modify the beam size or focus, which may allow for consistent laser ablation beam positioning.

Modifying a repetition frequency of the laser light (for example where the laser source 220 is a pulsed laser source 220) may allow for a modification to the extent of ablation achieved by the ablation beam in a given time. This may allow, for example, for the depth and/or pattern of the registration feature 226 to be different to each of the first grooves 212*a*, 212*b*, for example, for a given speed of movement of the stack 200 relative to the ablation beam.

In some embodiments, the method may comprise providing a substance 240 in the region of each of the plurality of first grooves 210*a*, 212*a*, 210*b*.

Figure 5:
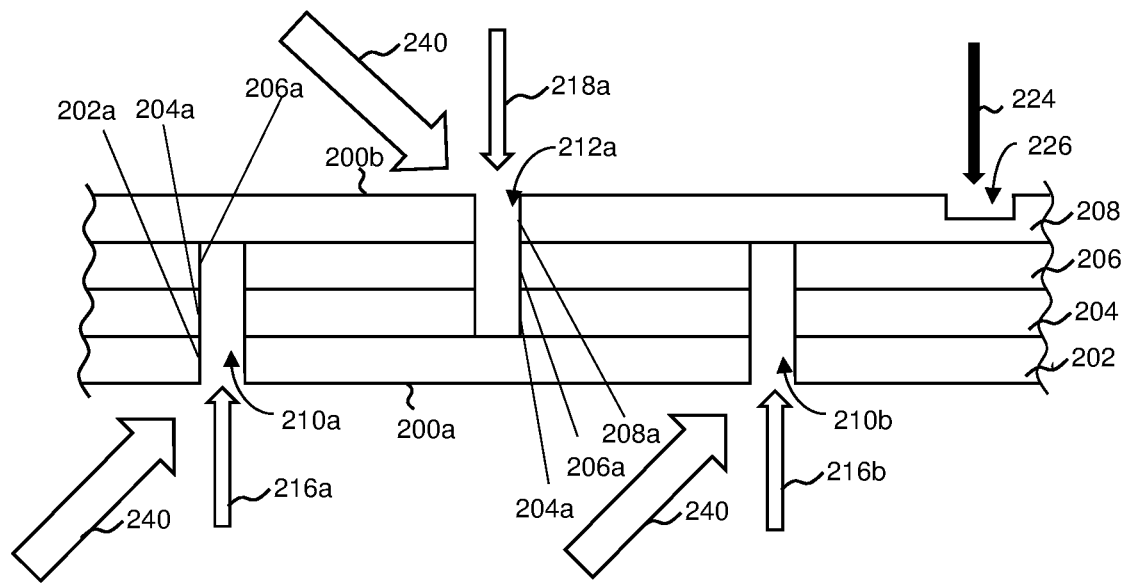
FIG. 5 is a schematic diagram that illustrates one way of processing a stack, according to some embodiments.

For example, referring to FIG. 5, there is illustrated schematically again the stack 200 comprising the substrate layer 202, the cathode layer 204, the electrolyte layer 206 and the anode layer 208. Similar to the arrangement in FIG. 4, laser ablation 216*a*, 216*b*, 218*a* is being applied to form the plurality of first grooves 210*a*, 210*b*, 212*a*, respectively (in accordance with an example of step 203 of the method described with reference to FIG. 3), and laser ablation 224 is being applied to form the registration feature 226 (in accordance with an example of step 205 of the method described with reference to FIG. 3).

As illustrated in FIG. 5, the laser ablating to form the first grooves 210*a*, 212*a*, 216*b* exposes surfaces, for instance edges, of at least an electrode layer 204, 208 of the stack 200. Taking a first 210*a* of the first grooves formed from the first side 200*a* of the stack 200 as an example, as illustrated in FIG. 4, the laser ablation forming the first 210*a* of the first grooves exposes edges of the substrate layer 202*a*, edges 204*b* of the cathode layer 204, and edges 206*a* of the electrolyte layer 206. Similarly, for a second 212*a* of the first grooves formed from the second side 200*b* of the stack, the laser ablation exposes edges 202*a* of the anode layer 208, edges of the electrolyte layer 206, and edges 204*a* of the cathode layer 204.

As already mentioned, in some embodiments, the method comprises providing a substance 240 in the region of each of the plurality of first grooves 210*a*, 212*a*, 210*b*.

In some embodiments, the substance comprises an inert gas. The inert gas may be substantially dry. The inert gas may displace oxygen and/or moisture in the region of the laser ablation. This may reduce the propensity of reaction of the layers 202 to 208 at the exposed surfaces, such as edges 202*a*, 204*a*, 206*a*, 208*a*, during laser ablation forming the first grooves 210*a*, 212*a*, 210*b*. This process may preserve the purity of the layers, which may, in turn, provide for more reliable operation of cells produced from the stack 200.

In some embodiments, the substance 240 comprises a monomer. The monomer may be suspended in a gas, for example the inert gas. In some embodiments, the method may comprise providing the monomer suspended in the inert gas in the region of the at least one of the first grooves 210*a*, 212*a*, 210*b* during the laser ablating to form the first groove such that the monomer is polymerised onto an exposed surface, such as an edge 204*a*, 208*a* of the first electrode layer 204, 208. For example, the monomer may be polymerised by the laser ablation itself, i.e. in a light-induced polymerisation.

Figure 6:
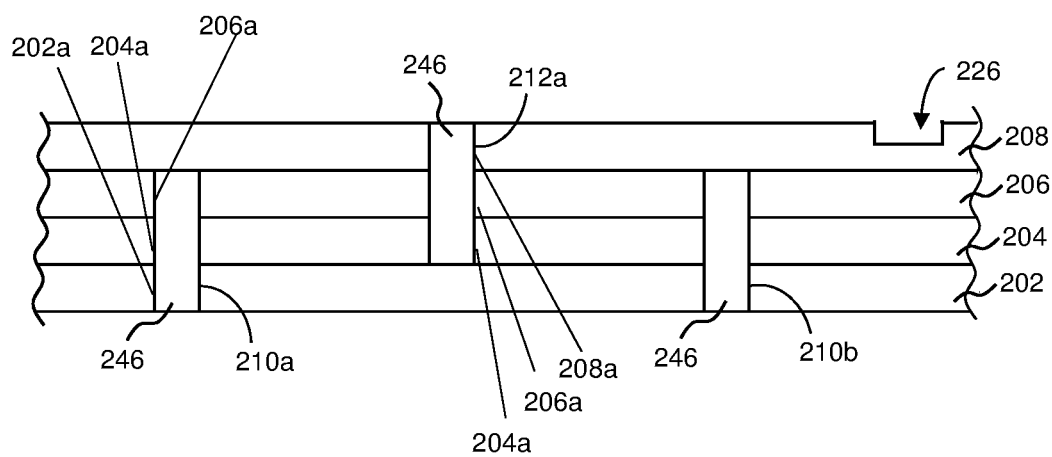
FIG. 6 is a schematic diagram that illustrates a stack produced, according to the processing of FIG. 5.

FIG. 6 illustrates schematically the stack 200 of FIG. 5 after the laser ablation has been performed. As illustrated in FIG. 6, the polymerised monomer 246 (hereinafter polymer 246) may be formed onto each of the surfaces, such as edges 202*a*, 204*a*, 206*a*, 208*a* that are exposed by the laser ablation to form the first grooves 210*a*, 212*a*, 210*b*. As illustrated in FIG. 5, the polymer 246 may substantially fill each of the plurality of first grooves 210*a*, 212*a*, 210*b*. The polymer 246 being formed onto the exposed edges 202*a*, 204*a*, 206*a*, 208*a* may, for example, protect the exposed edges from degradation, for example during subsequent processing of the stack 200.

In some embodiments, the polymer 246 may be an electrically insulating material or dielectric. For example, the polymer 246 may be formed onto the exposed surfaces, such as edges 202*a*, 204*a*, 206*a*, 208*a* so as to provide an electrical insulation between the exposed edges 204*a*, 208*a* of the first electrode 202, 206 (i.e. one of the cathode layer 204 and the anode layer 208) and the exposed edges 204*a*, 208*a* of the second electrode 202, 206 (i.e. the other of the cathode layer 204 and the anode layer 208). This may avoid direct electrical contact and hence shorting of the charged anode layer 206 with the cathode layer 202 during laser ablation and/or in further processing of the stack 200 (e.g. the folding described in more detail hereafter). This may improve consistency of stack processing and/or may improve the safety of the processing. As described in more detail hereafter, providing the insulating material in the first grooves at this stage may also reduce the need to provide insulation on of the folded stack edges at a later stage in the further processing of the stack 200, which may in turn allow for more efficient further processing of the stack 200.

In any case, polymerising the monomer onto the exposed edges 202*a*, 204*a*, 206*a*, 208*a* using the laser beam that is used for laser ablating to form the plurality of first grooves 210*a*, 212*a*, 210*b* may, for example, reduce the need to provide for or obviate a separate deposition system to cover (e.g. electrically insulate) the exposed edges. In addition, or alternatively, such an approach may reduce the need to perform the covering of the exposed edges at a different time, and hence may provide for a more efficient processing of the stack 200.

In some embodiments the substance 240 may be provided in the region of the registration feature 226 during laser ablation for forming the registration feature 226 (so that a polymerised monomer 246 is formed therein), for example to provide similar advantages as have been mentioned in respect of the first grooves. However, in other embodiments (as shown), the substance 240 may not be provided in the region of the registration feature 226 and/or the registration feature 226 may not have polymerised monomer formed thereon or therein (for example, the laser ablation for forming the registration feature 226 may be such so as to not cause polymerisation of the monomer). In some embodiments, the registration feature 226 may be different to each of the plurality of first grooves 210*a*, 210*b*, 212*a*, in that, for example only in that, the registration feature 226 does not have polymerised monomer 246 formed therein, whereas the each of the plurality of first grooves 210*a*, 210*b*, 212*a* does have polymerised monomer 246 formed therein.

The (intermediate) product of the method described with reference to FIGS. 3 to 6 may therefore be a stack 200 comprising a substrate 202, a first electrode layer 204/208, a second electrode layer 204/208, and an electrolyte layer 206 between the first electrode layer 204/208 and the second electrode layer 204/208. The stack 200 defines a plurality of first groves 210a, 210b, 212a, each first groove being through the first electrode layer 204/208 and the electrolyte layer 206, and further comprises at least one registration feature 226 for indicating a fold point at or towards which the stack is to be folded. Each of the plurality of first grooves 210a, 210b, 212a may have an insulating material deposited therein. In some embodiments (e.g. as described in more detail hereafter), the stack 200 may be folded at or towards the registration feature 226.

An apparatus (see, for example, apparatus 225 in FIG. 4) may be arranged to perform the method described with respect to FIGS. 1 to 5. In some embodiments, referring again to FIG. 4, the apparatus may comprise a laser system 223, which may comprise the laser source 220, a modifier element 22, and a control unit 221.

The laser system 223 may be arranged to, in use: laser ablate the stack 200 to form the plurality of first grooves 210a, 210b, 212a in the stack 200, each of the plurality of first grooves being through the first electrode layer 204/208 and the electrolyte layer 206. In some embodiments, the apparatus 225 may be arranged to form, in or on the stack, at least one registration feature 226, different from each of the plurality of first grooves 210a, 210b, 212a, for indicating a fold point at or towards which the stack 200 is to be folded. For example, in some embodiments the apparatus 225 may comprise a mark making means, for example a cutting means (which may not be a laser-based means) to form the registration mark. However, as already described, in some embodiments, the laser system 223 may be arranged to laser-ablate the stack 200 to form the at least one registration feature 226, which is different from each of the plurality of first grooves 210a, 210b, 212a, for indicating a fold point at or towards which the stack 200 is to be folded.

The laser system 223 may be arranged to laser ablate the stack 200 to form the plurality of first grooves 210a, 210b, 212a and laser ablate the stack 200 to form the at least one registration feature 226 using laser light from the first laser source 220.

In these embodiments, the apparatus 225 may comprise a modifier (depicted, for example, as element 222) that is arranged to modify a property of the laser ablation to form the plurality of first grooves 210a, 210b, 212a to provide the laser ablation to form at least one registration feature 226. The control unit 221 may be arranged to control the modification of the laser ablation by such a modifier 222.

In some embodiments, the modifier may be arranged to modify a speed at which the stack 200 is moved relative to the laser system 223 (not shown). For example, the apparatus 225 may comprise means (not shown) for moving the stack 200 (for example a motor of a reel in a reel-to-reel type process as described) and/or for moving the laser source 220 or an ablation beam thereof (for example, a motor of a moveable ablation head (not shown)). In these embodiments, the control unit 210 may be arranged to control the speed at which the stack 200 is moved. For example, the control unit 221 may be arranged to control the speed at which the means (not shown) moves the stack 200 and/or the laser system 223.

In some embodiments, the modifier (for example, element 222) may be arranged to modify a property of first laser light used for the laser ablating for forming the plurality of first grooves 210a, 210b, 212a, to provide second laser light that is used for the laser ablation for forming the at least one registration feature 226. In these embodiments, the control unit 221 may be arranged to control the modifier to modify the property of the laser light.

For example, the modifier may be or may comprise a component (not shown) of the laser source 200 itself, for example, that changes the way in which the laser source 200 produces laser light. For example, the modifier may modify an intensity, a power and/or a repetition frequency of the laser light produced by the laser source 200. In these embodiments, the control unit 221 may be communicatively connected to the laser source 220 so as to control the component of the laser source 220. Modifying a property of the laser light produced from the laser source 200 itself may allow, for example, for modification of the ablation beam(s) without modification of the laser path, which may allow for consistent ablation.

In some embodiments, the modifier may be or may comprise a modifier element 222 that modifies a property of the laser beam as produced by the laser source 200. For example, the modifier element 222 may comprise a mask. For example, the mask may modify a shape and/or intensity of the laser beam. As another example, the modifier element 22 may comprise one or more optical elements. For example, one such optical element may be or may comprise a neutral density filter for reducing a power and hence intensity of the laser light. As another example, the optical element may comprise a lens. For example, the lens may be configurable to modify a focus position of the laser beam. In these embodiments, the control unit 210 may be arranged to control the modifier element 222 to modify the property of the laser beam. For example, the control unit may control movement of the modifier element to effect control of the modification of the laser beam from the laser source 220. Modifying the laser light by using a modifier element 222 that is in the beam path of the laser beam, which in turn is produced by the laser source 200, may allow for flexible modification, as well as for modification without the need to change the production of the laser light by the laser source 220, which in turn may allow for consistent laser light production.

In some embodiments, the apparatus 225 may comprise a substance source (not shown) for introducing, for example for selectively introducing, the substance 240 (for instance an inert gas, a monomer, and/or a monomer suspended in an inert gas) into the region of the first grooves 210a, 210b, 212a, as has been described above by way of example with reference to FIG. 6.

FIGS. 7 to 11 illustrate schematically exemplary further processing of the stack 200 that is formed by the method and/or apparatus 225 described with reference to FIGS. 3 to 6.

In some embodiments, the further processing may comprise a method of identifying the registration feature 226, and folding the stack 200 at or towards the registration feature 226.

A folding machine (not shown) may be arranged to identify the registration feature 226 and fold the stack 200 at or towards the registration feature(s) 226.

In some embodiments, the folding machine (not shown) may be part of the apparatus 225 described above. Alternatively, the folding machine may be separate to the apparatus 225 described above. The folding machine (not shown) may comprise a means (not shown) for recognising or identifying the registration feature(s) 226. For example, the recognising means may comprise a camera or other sensor arranged to recognise the registration feature 226 of the stack 200 as distinct from each of the plurality of first grooves 210a, 210b, 212a etc. The folding machine being arranged to fold the stack 200 at or towards the identified registration mark may allow the folding machine to fold the stack 200 reliably and efficiently, for example without having to count the number of first grooves between each fold.

In some embodiments, the further processing of the stack 200 may comprise cutting the stack 200 into one or more ribbons 254, 260 before folding the stack 200 at or towards the registration feature 226.

Figure 7:
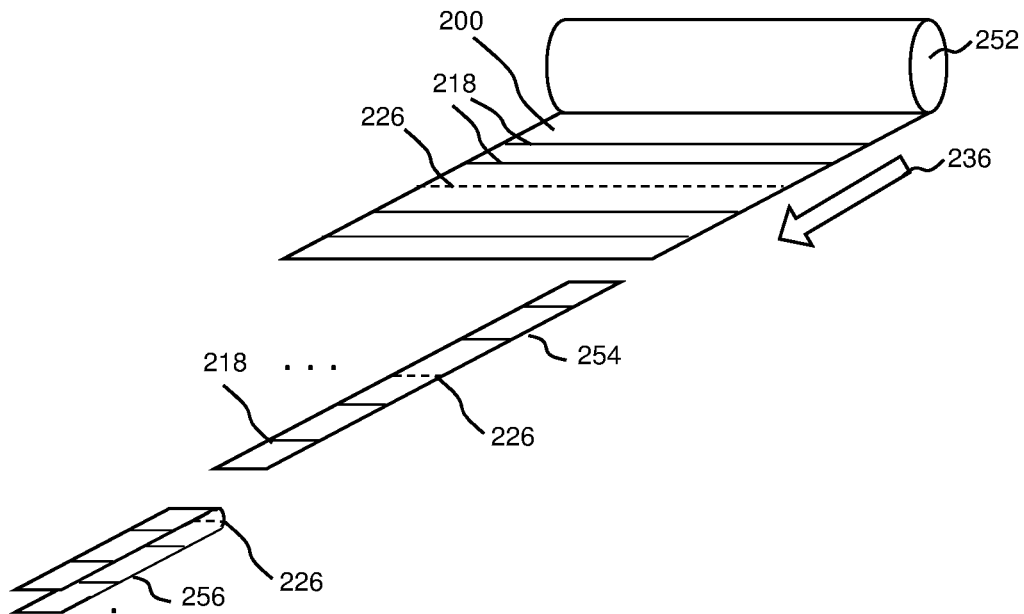
FIGS. 7 to 11 illustrate schematically exemplary ways of further processing the stack of any one of FIGS. 4 to 6.

For example, referring specifically now to FIG. 7, there is illustrated schematically an example of further processing of the stack 200 in a reel-to-reel type process. As illustrated in FIG. 7, the stack 200 is provided from a reel 252 so as to travel in the first direction 236. The plurality of first grooves 218 and the registration feature 226 may be formed on/in the stack 200, for example as described with reference to FIGS. 3 to 6. In the example illustrated in FIG. 7, the plurality of first grooves 218 and the registration feature 226 (which in this example takes the form of a groove 226 parallel to the first grooves) are elongate in a direction perpendicular to the first direction of travel 236.

As illustrated schematically in FIG. 7, the stack 200 (having the first grooves 218 and the registration feature 226 formed therein) may be cut into a plurality of ribbons 254 (only one is shown in FIG. 7). For example, the ribbons 254 may be formed by laser cutting (not shown) the stack 200 along a direction parallel to the first direction of travel 236. Each ribbon 254 is elongate in a direction perpendicular to the length of the first grooves 218. Each ribbon 254 may then be folded at or towards the registration feature 226 (for example in a folding process and/or by the folding machine as described) to create a folded stack 256 (i.e. a stack that is folded at or towards the registration mark 226). It will be appreciated that although only one fold is illustrated in FIG. 7, in other examples there may be many folds such that the folded stack 256 comprises many layers of the stack 200, for example dozens or hundreds of layers (see also FIG. 9).

Figure 8:
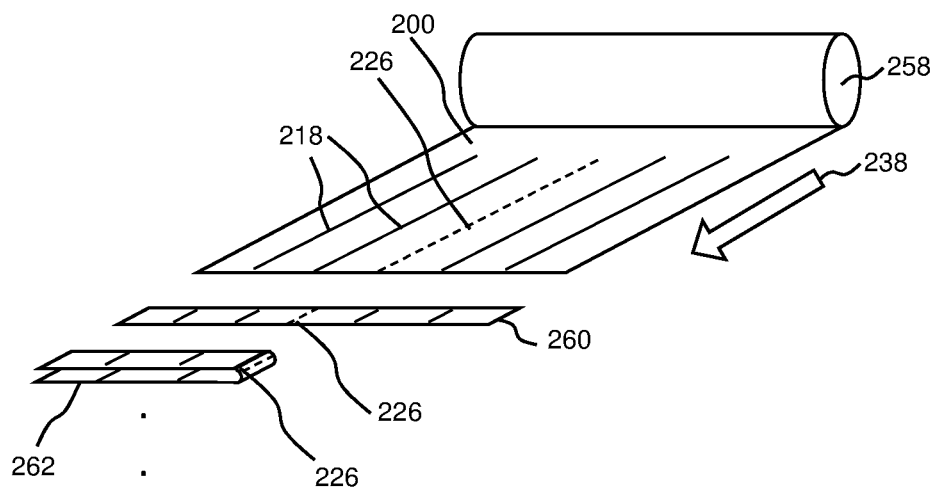

As another example, referring now to FIG. 8, there is illustrated schematically another example of further processing of the stack 200. As illustrated in FIG. 8, the stack 200 is provided from a reel 258 so as to travel in the second direction 238. The plurality of first grooves 218 and the registration feature 226 may be formed on/in the stack 200, for example as described with reference to FIGS. 3 to 6. In the example illustrated in FIG. 8, the plurality of first grooves 218 and the registration feature 226 (which in this example takes the form of a groove 226 parallel to the first grooves) are elongate in a direction parallel to the second direction of travel 238. As described, forming the first grooves 218 and/or registration feature 226 in this orientation may allow for the laser source(s) and/or ablation beams produced thereby to be provided from a static laser system relative to which the stack 200 may be moved, for example to form the first grooves 218 and/or the registration feature 226 in a substantially continuous process, which may be efficient.

As illustrated schematically in FIG. 8, the stack 200 (having the first grooves 218 and the registration feature 226 formed therein) may be cut into a plurality of ribbons 260 (only one is shown in FIG. 8). For example, the ribbons 260 may be formed by laser cutting (not shown) the stack 200 along a direction perpendicular to the second travel direction 238. Again, each ribbon 260 is elongate in a direction perpendicular to the plane of the first grooves 218. Each ribbon 260 may then be folded at or towards the registration feature 226 (for example in a folding process and/or by the folding machine described above) to create a folded stack 262 (i.e. a stack that is folded at or towards the registration mark 226). It will be appreciated that although only one fold is illustrated in FIG. 8, in other examples there may be many folds such that the folded stack 262 comprises many layers of the stack 200, for example dozens or hundreds of layers (see also FIG. 9).

It will be appreciated that, in some embodiments, the folded stack 256 of FIG. 7 may be substantially the same as (e.g. indistinguishable from) the folded stack 262 of FIG. 8. However, cutting of the stack 200 substantially parallel to the first direction of travel 236 as per FIG. 8 may allow for parallel processing of each of the ribbons 254 that are produced, and hence may allow for an efficient production process.

A cutting apparatus (not shown) arranged to cut the stack 200 to form the ribbons 254, 260 may be provided. The cutting apparatus (not shown) may form part of the apparatus 225 and/or the folding machine (not shown) as described or may be a separate apparatus. The cutting apparatus (not shown) may comprise a laser cutter (not shown) arranged to cut the stack into the ribbons 254, 260.

Figure 9:
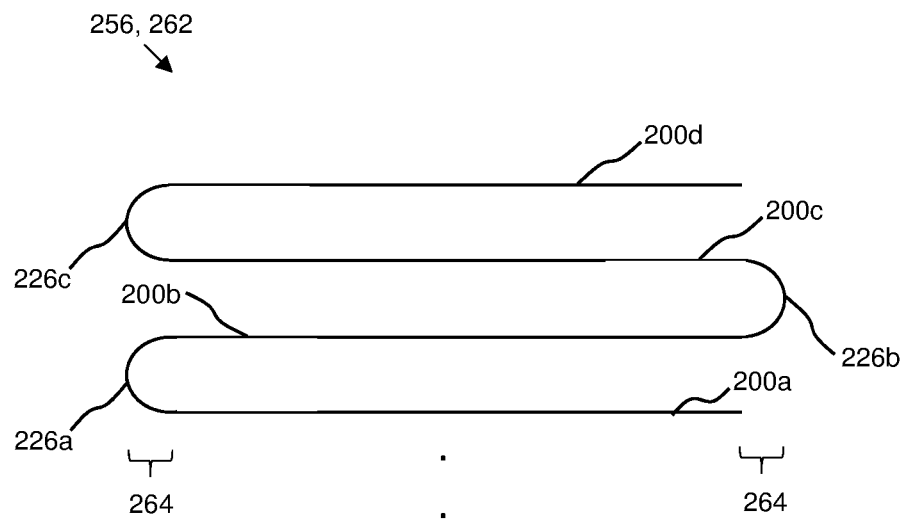

Referring now to FIG. 9, there is illustrated an example of a folded stack 256, 262. The folded stack 256, 262 may be produced by the folding process and/or folding machine as described, for example, by the process described with reference to FIGS. 7 and 8. As illustrated in FIG. 9, the folded stack 256, 262 has four stack layers 200a-200d (each stack layer comprising the stack 200 formed from the method described with reference to FIGS. 3 to 6). The stack is folded in a "z-fold" arrangement. In other words, the second stack layer 200b is folded back over the first stack layer 200a at a first registration feature 226a, such that the plane defined by the layers of the first stack layer 200a and the second stack layer 200b are substantially parallel with one another. Similarly, the third stack layer 200c is folded back over the second stack layer 200b at a second registration feature 226b, and the fourth stack layer 200d is folded back over the third stack layer 200c at a third registration feature 226c. Since the registration features 226a-226c are equally-spaced along the length of the ribbon 256, 262, each stack layer 200a-200d is of the same length, so that the stack layers 200a-200d register or align with one another. The portions 264 of the stack layers 200a-200d at the folds (i.e. distal from a central portion of the folded stack 256) may be removed and/or regarded as waste material.

In some embodiments, the further processing may comprise segmentation of the folded stack 256, 262 into cells 270a, 270b.

Figure 10:
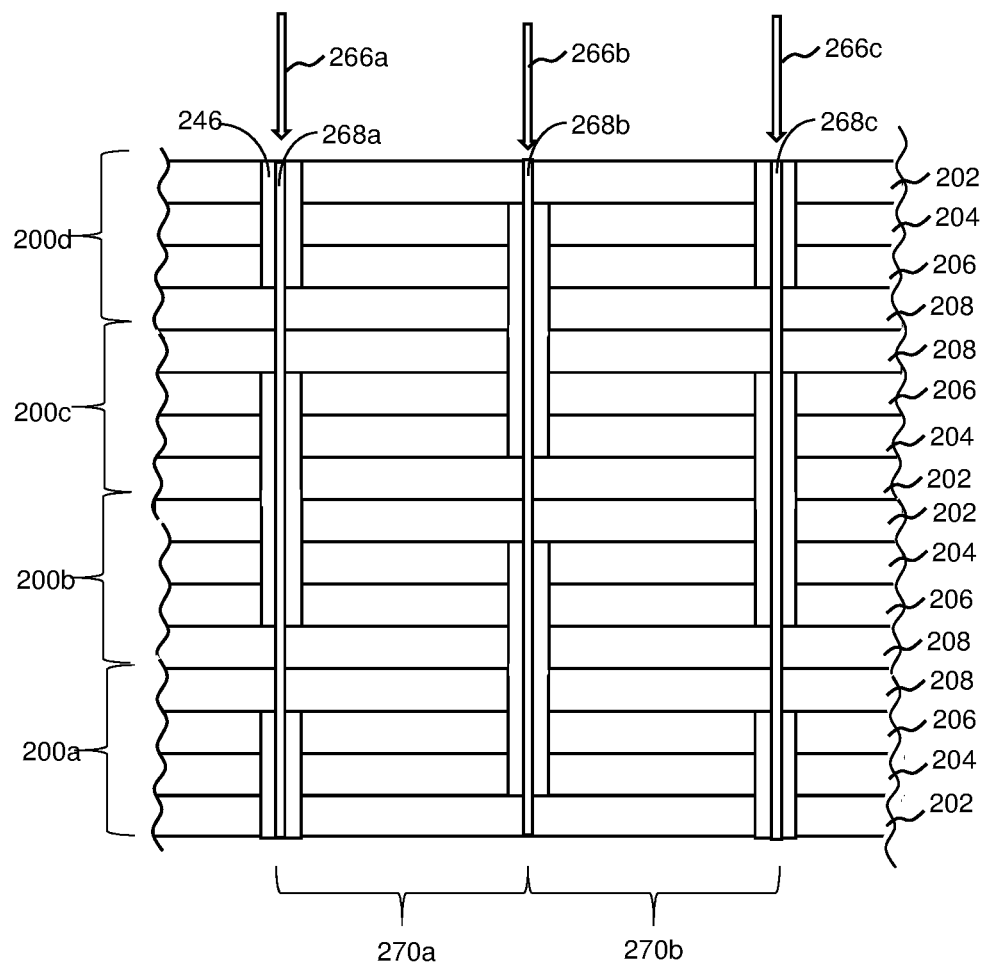

For example, referring to FIG. 10, there is illustrated a central portion of the folded stack 256, 262 in more detail. As illustrated in FIG. 10, each of the stack layers 200a-200d are aligned with one another, i.e. such that the first grooves (e.g. each being filled with insulating polymer material 246) of one stack layer 200a are aligned (i.e. vertically aligned in the sense of FIG. 10) with the corresponding first groves of an adjacent stack layer 200b. Each stack layer comprises the substrate layer 202, the cathode layer 204, the electrolyte layer 206 and the anode layer 202. It will be noted that, due to the folding of the second stack layer 200b back onto the first stack layer 200a, the second stack layer 200b is inverted as compared to the first stack layer 200a, and similarly the third stack layer 200c is inverted as compared to the second stack layer 200b, and similarly the fourth stack layer 200d is inverted as compared to the third stack layer 200c.

As illustrated schematically in FIG. 10, the further processing may comprise cell segmentation, that is, segmentation of the folded stack into battery cells 270a, 270b. In this example the cell segmentation comprises laser ablation 266a-266c to form cuts 268a-268c through all of the first to fourth stack layers 200a-200d at each of the positions in which the first grooves are aligned. It will be appreciated that in examples where the first grooves are filled with the polymer 246, the cuts 268a-268c include cuts through the polymer 246. The cuts 268a-268c segment the folded stack into cells 270a, 270b.

A segmentation apparatus (not shown) arranged to segment the folded stack 256, 252 into cells 270a, 270b, for example as described herein, may be provided. The segmentation apparatus (not shown) may be part of the apparatus 225, the folding machine (not shown), and/or the cutting apparatus (nots shown), or may be a separate apparatus. The segmentation apparatus (not shown) may comprise a laser cutter for cutting through the stack layers in order to form the cells 227a, 227b, as described.

Figure 11:
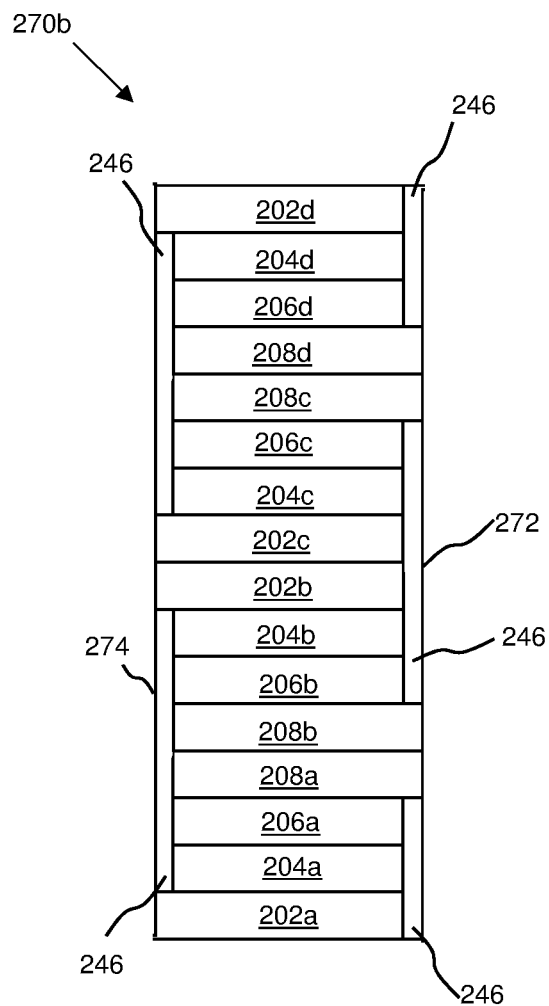

An example of a segmented cell 270b is illustrated in FIG. 11.

The cell 270b comprises the layers in the following order (from bottom to top in the sense of FIG. 11): first substrate layer 202a, first cathode layer 204a, first electrolyte layer 206a, first anode layer 208a, second anode layer 208b, second electrolyte layer 206b, second cathode layer 204b, second substrate 202b, third cathode layer 204c, third electrolyte layer 206c, third anode layer 208c, fourth anode layer 208d, fourth electrolyte layer 206d, fourth cathode layer 204d and fourth substrate 202d.

The formation of the first grooves in the stack 200 and the insulating material 246 provided in the first grooves, the folding, and the segmentation as described provide that, for the segmented cell 270b, only surfaces comprising the anode layers 208a-208d are exposed on a first side 272 of the cell (the right hand side in the sense of FIG. 10) with all of the other layers being insulated on the first side 272 by the polymer 246. Moreover, only surfaces comprising the substrate layers 202a-202d are exposed on a second, opposite, side 274 of the cell 270b with all of the other layers being insulated on the second side 272 by the polymer 246. As described, the substrate layers 202a-202d may comprise a conductive material, for example nickel.

The first side 272 of the cell 270b may be coated with a first conductive material (not shown) so as to electrically connect all of the anode layers 208a-208d together, and the second side 274 of the cell 270b may be coated with a second conductive material (not shown) so as to electrically connect all of the substrate layers 202a-202d (and hence all of the cathode layers 204a-204d) together. For example, a sputtered metallic layer may be applied on both sides 272, 274 of the cell 270b. In this way, for example, the first conductive material may provide a contact for a first terminal of the cell 270b (e.g. a positive terminal of the cell 270b), and the second conductive material provide a contact for a second terminal of the cell 270b (e.g. a negative terminal of the cell 270b). In other words, in effect the four sub cells (i.e. one each for the four stack layers 200a-200d) of the cell 270b are connected in parallel. The positive and negative terminals may be electrically connected across a load to power the load. Providing the cell 270b that comprises a set of sub cells (i.e. one each for the four stack layers 200a-200d) may provide for a battery cell useful, for example, to provide for relatively high discharge rates, which may be useful in some applications.

It will therefore be appreciated that the registration feature 226 formed on/in the stack 200 may, as described herein, provide for reliable and efficient folding of the stack, which may in turn provide for reliable and efficient production of an energy storage device, e.g. a cell 270b.

The above embodiments are to be understood as illustrative embodiments of the disclosure. It is to be understood that any feature described in relation to any one example may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method comprising:
   obtaining a stack for an energy storage device, the stack comprising a substrate, a first electrode layer, a second electrode layer, and an electrolyte layer between the first electrode layer and the second electrode layer;
   laser ablating the stack to form a plurality of first grooves in the stack, each of the plurality of first grooves being through the first electrode layer and the electrolyte layer; and
   forming, in or on the stack, at least one registration feature, different from each of the plurality of first grooves,
   wherein, for at least one of the plurality of first grooves, laser ablating to form the groove exposes a surface of at least the first electrode layer; and wherein the method further comprises:
   providing a monomer suspended in an inert gas in the region of the groove during the laser ablating thereof such that the monomer is polymerised onto the exposed surface of the first electrode layer.

2. The method of claim 1, wherein forming the at least one registration feature comprises laser ablating the stack to form the at least one registration feature.

3. The method of claim 2, wherein laser ablating to form the plurality of first grooves and laser ablating to form the at least one registration feature use laser light from a common laser source.

4. The method of claim 2, wherein the method comprises modifying a property of the laser ablating to form the plurality of first grooves, to provide the laser ablating to form the at least one registration feature.

5. The method of claim 4, wherein modifying the property of the laser ablating comprises modifying a property of first laser light, used for the laser ablating to form the plurality of first grooves, to provide second laser light used for the laser ablating to form the at least one registration feature.

6. The method of claim 1, wherein the method comprises moving, concurrently with or intermittently of the laser ablating to form the plurality of first grooves or the at least one registration feature, the stack in a first direction, and wherein each of the plurality of first grooves formed in the stack is elongate in a direction parallel to the first direction.

7. The method of claim 1, wherein the at least one registration feature is formed per a given number of adjacent ones of the plurality of first grooves.

8. The method of claim 1, wherein the plurality of first grooves are formed sequentially, and wherein the at least one registration feature is formed after a given number of sequential ones of the plurality of first grooves are formed.

9. The method of claim 1, wherein the at least one registration feature comprises a mark on a surface of the stack, a groove into the stack that is at least wider, deeper, or has a different shape than each of the plurality of first grooves, or a perforation in the stack.

10. The method of claim 1, wherein the method further comprises:

identifying the registration feature; and folding the stack at or towards the identified registration feature.

11. Apparatus for processing a stack for an energy storage device, the stack comprising a substrate, a first electrode layer, a second electrode layer, and an electrolyte layer between the first electrode layer and the second electrode layer, the apparatus comprising:

a laser system arranged to, in use:

laser ablate the stack to form a plurality of first grooves in the stack, each of the plurality of first grooves being through the first electrode layer and the electrolyte layer; and wherein the apparatus is arranged to:

form, in or on the stack, at least one registration feature, different from each of the plurality of first grooves; and fold the stack at or towards the registration feature.

12. A stack for an energy storage device, the stack comprising a substrate, a first electrode layer, a second electrode layer, and an electrolyte layer between the first electrode layer and the second electrode layer; the stack defining a plurality of first grooves, each first groove being through the first electrode layer and the electrolyte layer; the stack further comprising at least one registration feature, different to each of the plurality of first grooves, wherein the at least one registration feature is a mark on a surface of the stack or a groove that does not penetrate more than one layer of the stack.

13. The stack of claim 12, wherein each of the plurality of first grooves has an electrically insulating material deposited therein.

14. A method comprising:

folding a stack for an energy storage device, at or towards a registration feature, wherein the stack comprises a substrate, a first electrode layer, a second electrode layer, and an electrolyte layer between the first electrode layer and the second electrode layer; the stack defining a plurality of first grooves, each first groove being through the first electrode layer and the electrolyte layer; the stack further comprising the registration feature, different to each of the plurality of first grooves.

15. The method of claim 14, wherein the method further comprises:

laser ablating to form the plurality of first grooves; and laser ablating to form the at least one registration feature, wherein each laser ablating step uses laser light from a common laser source.

16. The method of claim 14, wherein the method further comprises:

laser ablating to form the plurality of first grooves; and laser ablating to form the at least one registration feature, wherein at least one property of the laser ablating is different between laser ablating to form the plurality of first grooves and laser ablating to form the at least one registration feature.

17. The method of claim 14, wherein the method further comprises moving, concurrently with or intermittently of laser ablating to form the plurality of first grooves or the at least one registration feature, the stack in a first direction, and wherein each of the plurality of first grooves formed in the stack is elongate in a direction parallel to the first direction.

18. The method of claim 14, wherein at least one of the registration feature is formed per a given number of adjacent ones of the plurality of first grooves.

19. The method of claim 14, wherein the plurality of first grooves are formed sequentially, and wherein the at least one registration feature is formed after a given number of sequential ones of the plurality of first grooves are formed.

20. The method of claim 14, wherein the at least one registration feature comprises a mark on a surface of the stack, a groove into the stack that is at least wider, deeper, or has a different shape than each of the plurality of first grooves, or a perforation in the stack.

\* \* \* \* \*